(12) United States Patent
Massey

(10) Patent No.: US 7,025,330 B2
(45) Date of Patent: Apr. 11, 2006

(54) BAR-STOCK BALL VALVE

(75) Inventor: Roger Massey, Portsmouth, NH (US)

(73) Assignee: Parker & Harper Companies, Inc., Raymond, NH (US)

( * ) Notice: Subject to any disclaimer, the term of this patent is extended or adjusted under 35 U.S.C. 154(b) by 803 days.

(21) Appl. No.: 09/585,222

(22) Filed: Jun. 1, 2000

(65) Prior Publication Data

US 2002/0005502 A1   Jan. 17, 2002

(51) Int. Cl.
*F16K 5/06* (2006.01)

(52) U.S. Cl. ............................. 251/315.1; 29/890.132

(58) Field of Classification Search ............ 251/315.1, 251/315.01; 29/890.132, 890.12
See application file for complete search history.

(56) References Cited

U.S. PATENT DOCUMENTS

| | | | |
|---|---|---|---|
| 1,882,697 A * | 10/1932 | Aldridge | |
| 2,309,666 A * | 2/1943 | Parker | |
| 2,420,785 A * | 5/1947 | Lorraine | 137/625.47 |
| 3,345,032 A * | 10/1967 | Rawstron | |
| 3,417,450 A * | 12/1968 | Zell | |
| 3,675,895 A * | 7/1972 | Matousek | 251/315.08 |
| 3,886,638 A | 6/1975 | Hayman et al. | 137/561 A |
| 3,905,522 A | 9/1975 | Johnston | 137/212 |
| 3,948,480 A * | 4/1976 | Paptzun et al. | 251/315 |
| 4,026,516 A * | 5/1977 | Matousek | 251/214 |
| 4,035,893 A * | 7/1977 | Zurit et al. | 29/890.11 |
| 4,280,526 A * | 7/1981 | Gonzalez | 137/315 |
| 4,311,298 A * | 1/1982 | Carlson | 251/144 |
| 4,333,497 A | 6/1982 | Busquets | 137/636.2 |
| 4,944,488 A * | 7/1990 | Clayson | 251/203 |
| 4,997,007 A * | 3/1991 | Niemann et al. | 137/625.47 |
| 5,080,128 A | 1/1992 | Taylor | 137/316 |
| 5,139,041 A * | 8/1992 | Albrecht | 137/15.22 |
| 5,365,650 A * | 11/1994 | Smith et al. | 29/417 |
| 5,816,359 A | 10/1998 | Gregorio et al. | 180/403 |
| 5,944,055 A * | 8/1999 | Dicky | 137/625.47 |
| 6,199,824 B1 * | 3/2001 | Lee | 251/315.1 |

* cited by examiner

Primary Examiner—Kevin Shaver
(74) Attorney, Agent, or Firm—Davis & Bujold, P.L.L.C.

(57) ABSTRACT

A barstock body fluid control valve comprising a barstock body of preselected material having an inlet end and an outlet end, and a preselected cross section defining the outer walls; a through machined main flow port located eccentrically on the inlet and the outlet ends wherein the main flow port eccentric location increases the available barstock thickness at one outer wall location and decreases barstock thickness in the opposite wall.

7 Claims, 4 Drawing Sheets

BAR-STOCK BALL VALVE

FIELD OF THE INVENTION

The present invention relates generally to barstock body valves and the size of barstock required, and particularly to the size and weight reduction achievable through eccentric (or off-center) machining of the barstock to create the valve body's flow passage. An eccentrically located flow passage results in a thinner wall adjacent to the flow passage, and an initially smaller barstock size.

BACKGROUND OF THE INVENTION

Valves that feature bodies machined from either hot or cold drawn metal bar, having either circular cross sections or sections formed as regular polygons are commonly referred to as "bar stock" valves. Bar stock valve bodies are particularly amenable to production on high speed automatic machines and therefore offer economies in manufacture not enjoyed by manufacturers of cast and forged valves.

Traditional bar stock valve bodies place the flow passage substantially along the central axis of the bar. The starting bar size is based on the resulting wall thickness, following machining, necessary to withstand the operating pressures the valve is exposed to in service. Choice of end connection also plays a role in sizing initial bar stock size. The bar size used, however, often is overly sufficient for the wall thickness requirements of the valve.

This over-design of the valve body frequently results from the need to provide adequate valve stem bearing support and adequate space for stem seals. To accommodate these items, the valve designer often selects a larger bar size, resulting in increased overall weight and cost of the valve body. Due to the manufacturing techniques used, it is inefficient to place the additionally required material locally in the valve body only where needed.

The over-design becomes more pronounced if an additional (third) port is to be added to a bar stock valve body. The third port typically is located on the opposite valve body side from the stem, decreasing further the possibility of obtaining sufficient space for the stem bearing support and seals.

SUMMARY OF THE INVENTION

Wherefore, it is an object of the present invention to overcome the aforementioned problems associated with standard barstock body valves by machining the primary passage of the valve eccentrically (off-centerline) permitting use of initially smaller and lighter barstock material.

Another object of the invention is to enable lengthening the stem of selected barstock valves to reduce reaction loads at the valve stem seal, applied from a side load on the outwardly protruding stem. Eccentrically locating the valve through bore provides increased distance between the bore centerline and one outer wall of the valve body. This increased distance permits a correspondingly longer valve stem, reducing stem reaction load at the valve stem seal.

According to the invention there is provided barstock of preselected size and material, an eccentrically located, longitudinally machined through flow bore, a perpendicularly machined stem bore, and inlet/outlet ports centered on the eccentric flow bore located at ends of the valve and machined and sized to match the desired valve connection type.

Also according to the invention there is provided a three way valve option maintaining the barstock weight savings through use of the eccentric machining of the longitudinal flow bore.

Also according to the invention there is provided a barstock body fluid control valve comprising: a barstock body of preselected material having an inlet end and an outlet end, and a preselected cross section defining the outer walls; a through machined main flow port located eccentrically on said inlet and said outlet ends; wherein said main flow port eccentric location increases the available barstock thickness at one outer wall location and decreases barstock thickness in the opposite wall.

BRIEF DESCRIPTION OF THE DRAWINGS

The invention will now be described, by way of example, with reference to the accompanying drawings in which.

DESCRIPTION OF THE PREFERRED EMBODIMENTS

Figure 1:
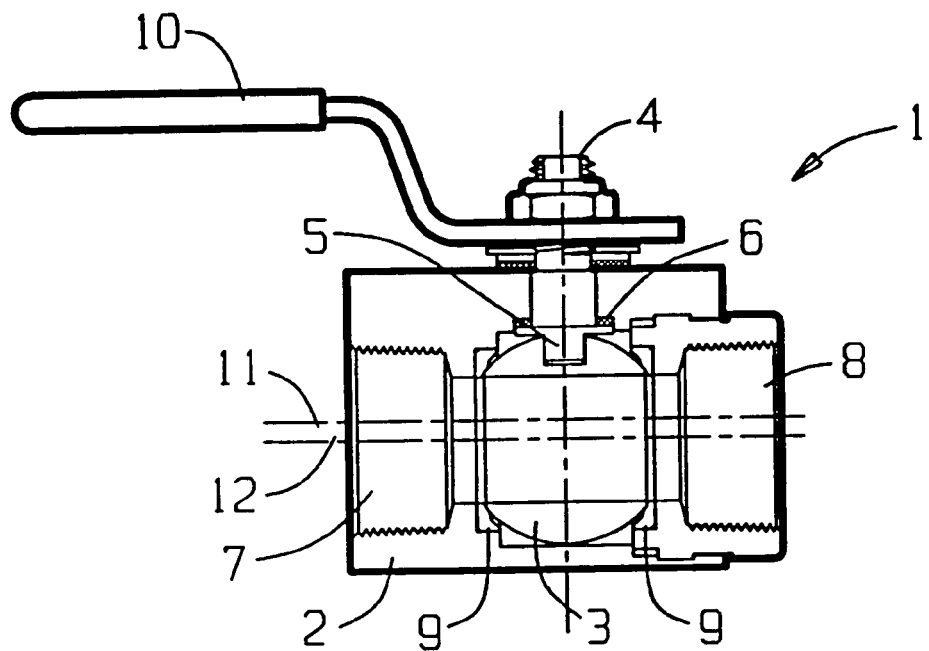
FIG. 1 indicates a sectioned elevation view of a typical valve assembly incorporating the invention, containing a body, a flow control ball, valve stem, stem tab, stem seal, flow ports, valve seats and handle and an eccentrically located flow bore centerline.

Turning first to FIG. 1, a cross-sectional view of a quarter-turn ball valve assembly is shown. The assembly 1 has a valve stem 4 with stem seal 6 installed in valve body 2 with integral valve stem tab 5 engaging a flow control ball 3. The valve stem 4 may be rotated by handle 10 by means of a mating shaped hole, having hole flats that bear on valve stem flats.

In operation handle 10 is rotated to turn ball 3 into position to permit fluid flow between port 7 and port 8. Rotating the stem back to its original position prevents flow between the two ports. Valve seats 9 prevent leakage between the ball 3 and body 2.

Also according to the invention, the throughbore centerline 12 is eccentrically located off the barstock centerline 11, such that, in FIG. 1 configuration of the invention, valve body 2 wall thickness is greater adjacent to the valve stem 4 side of the throughbore centerline 12. This increased wall thickness permits use of a longer stem which serves to diminish the magnitude of reaction forces applied to stem seal 6 in response to eccentric loading of stem 4.

Figure 1A:
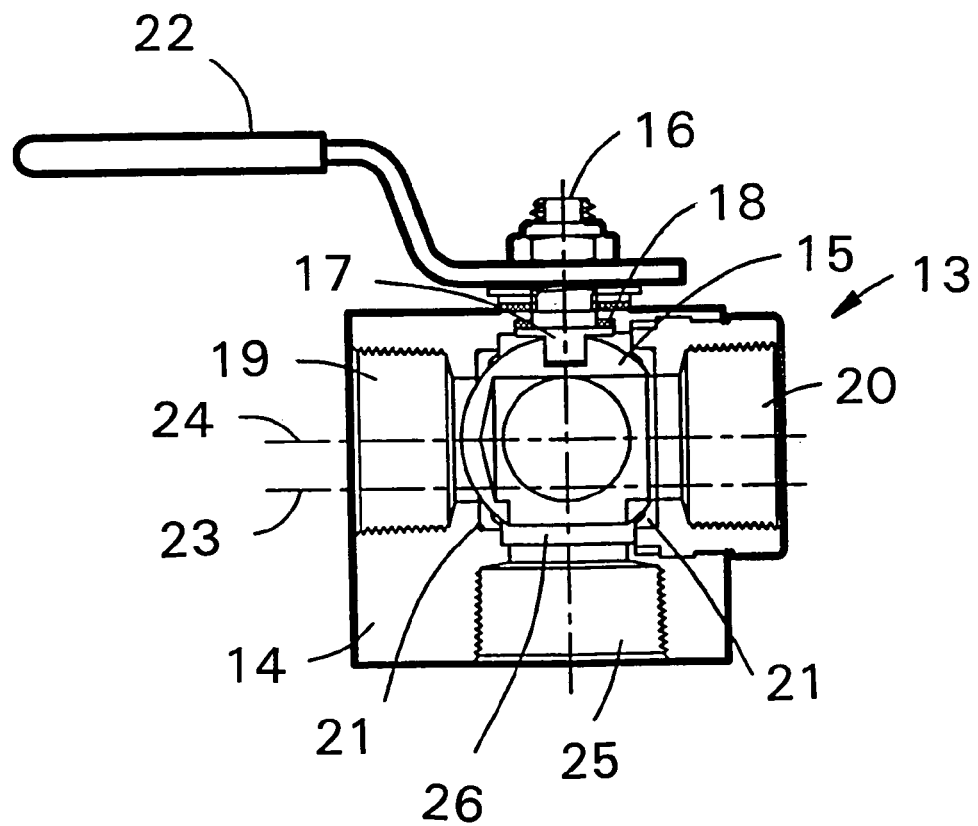
FIG. 1a indicates a sectioned elevation view of a valve as in FIG. 1 incorporating the invention, but with a third port provided within the body.

Turning to FIG. 1a, a cross-sectional view of a three-port quarter-turn rotary ball valve assembly is shown. Such an assembly is, in general, a substantially standard barstock valve. The assembly 1 has a valve stem 16 with stem seal 18 installed in valve body 14 with an integral valve stem tab 17 engaging a flow control ball 15. The valve stem 16 may be rotated by handle 22 by means of a mating shaped hole, having hole flats that bear on valve stem flats.

In operation, handle 22 is rotated to turn ball 15 into position to permit fluid flow between port 19 or port 20 via passage 26 and outlet port 25. Valve seats 21 provide added sealing to prevent fluid leakage between ports 19, 20 and 25.

Also according to the invention, the throughbore centerline 24 is eccentrically located off the barstock centerline 23, such that, in FIG. 1a configuration of the invention, valve body 14 wall thickness is greater adjacent to valve port 25 side of the throughbore centerline 24 than to the valve stem 16 side of the throughbore centerline 24. This increased wall thickness permits inclusion of the third port 25 within the envelope of the valve body 14.

Figure 2:
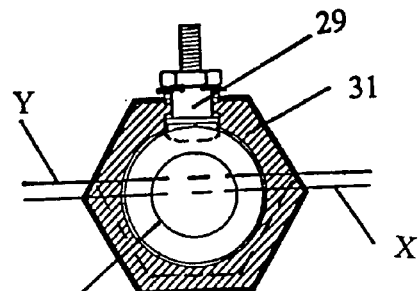
FIG. 2 indicates an end section view of a two port barstock valve body, centrally bored, incorporating a valve stem length limited to a central bore, the dashed line indicating possible barstock starting size reduction resulting from an eccentrically bored flow port.

Further according to the invention, a typical centrally bored barstock valve is depicted in FIG. 2 with valve stem 29 length limited to available barstock 31 wall thickness. Retaining valve stem 29 length, FIG. 2 dashed line indicates approximate reduced barstock 31 size achievable by eccentrically boring through port 33 at centerline X in lieu of dashed barstock size centerline Y.

Figure 3:
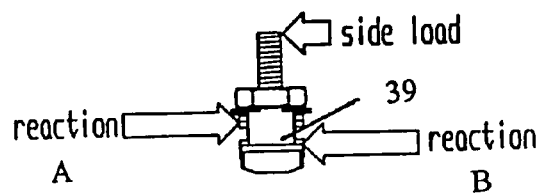
FIG. 3 indicates the reaction load locations resulting from a side load applied by a valve handle to a stem at the valve handle location.
Figure 4:
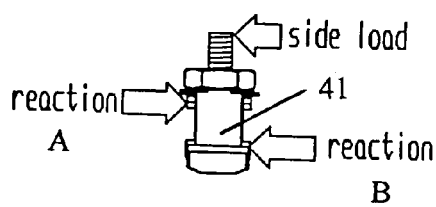
FIG. 4 indicates the reaction load locations resulting from a side load applied to a stem of increased length from the stem depicted in FIG. 3.

As seen in FIGS. 3 and 4, a side load applied by a valve handle results in reaction loads A and B. In FIG. 3 valve stem 39 indicates a standard barstock ball valve stem. FIG. 4 indicates a longer stem 41. Reaction load B in FIG. 4, due to increased stem length, would be reduced from reaction load B in FIG. 3 for the same given side load.

Figure 5:
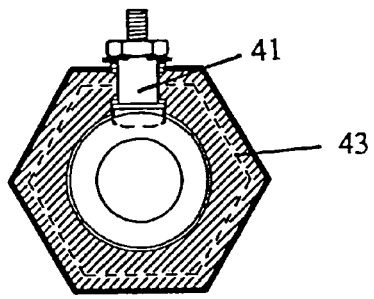
FIG. 5 indicates an end section view of the general increased barstock size required to incorporate a longer stem than shown in FIG. 2, if a central flow bore is retained, the dashed line indicating the net smaller barstock size of FIG. 2.
Figure 6:
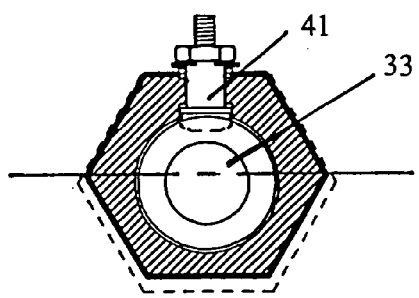
FIG. 6 indicates an end section view of the invention eccentrically bored flow port providing for an increased length stem, the dashed line indicating approximate barstock size savings compared to the centrally bored flow port of FIG. 5.

FIG. 5 indicates relative barstock size increase required to use the longer stem 41 with a typically center bored flow path barstock valve body 43. Applying the invention, FIG. 6 indicates the relative reduction in barstock size achievable to incorporate longer stem 41, by eccentrically boring through port 33.

Figure 7:
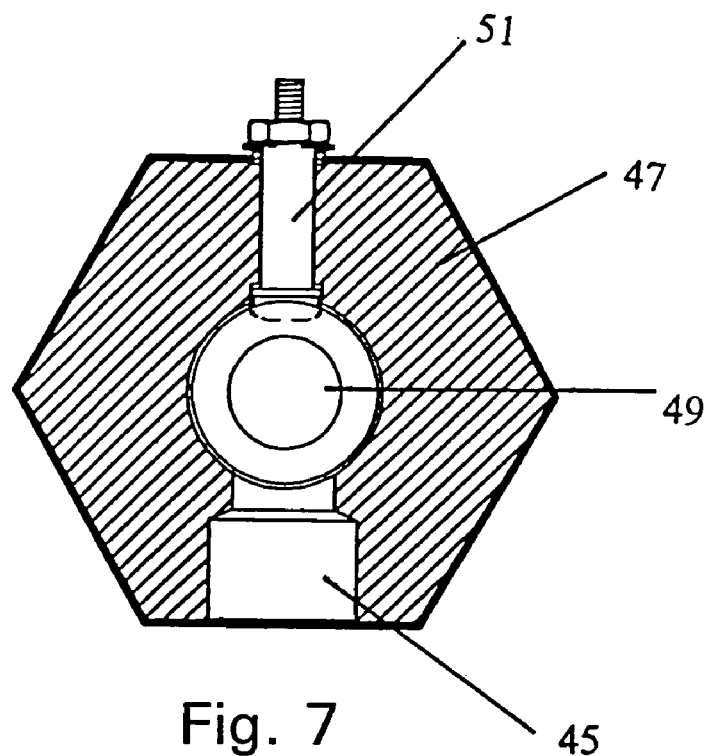
FIG. 7 indicates an end section view of the typical barstock size increase necessary to incorporate a third flow port, utilizing a centrally bored through flow port, and noting the extended stem length required to reach the centrally bored flow port.
Figure 8:
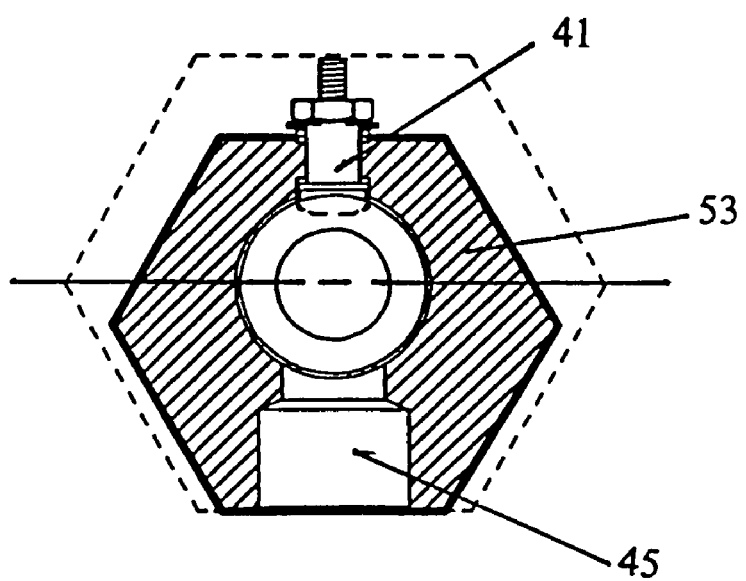
FIG. 8 indicates an end section view of a reduced barstock size achievable by the invention eccentrically bored main flow port, a third flow port sized as shown FIG. 7, and the FIG. 6 increased stem length, the dashed line indicating the approximate barstock size reduction achievable through eccentric flow port boring compared to the FIG. 7 relatively larger barstock size, and FIG. 9 provides a flow diagram for the method of the present invention.

In another application of the invention, FIGS. 7 and 8 indicate three-port valves centrally bored (FIG. 7) and eccentrically bored (FIG. 8). To incorporate bottom port 45, FIG. 7 indicates relative barstock size for the body 47 must be increased if center boring of the through port 49 is applied. FIG. 7 further indicates the resulting increase in stem 51 length. Applying the invention, FIG. 8 indicates the relatively smaller barstock body 53 achievable incorporating the same bottom port 45 of FIG. 7, without the unnecessary length of stem 51 of FIG. 7, but retaining the improved length stem 41 of the single port valve depicted in FIG. 6.

Figure 9:
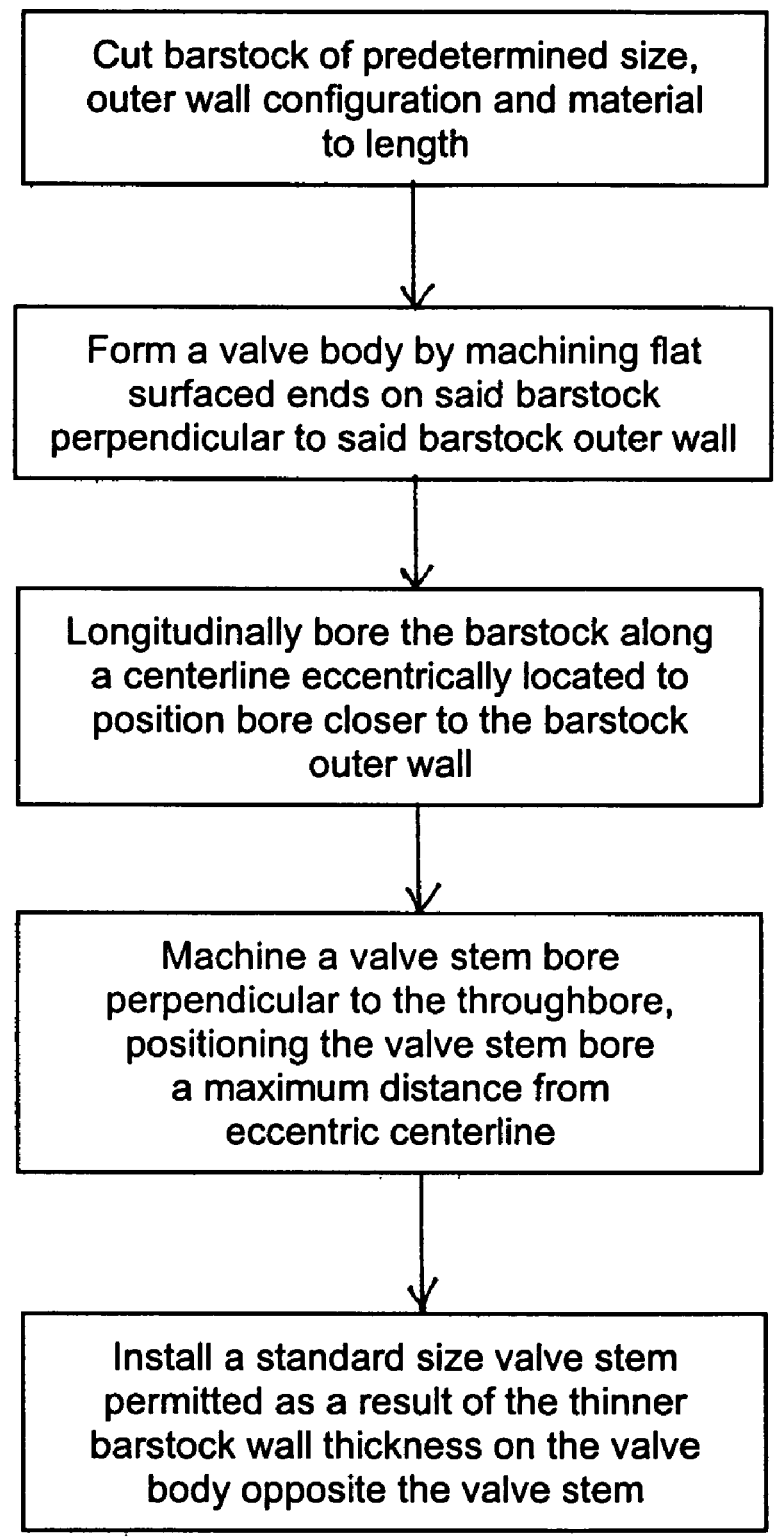

As shown in the flow diagram of FIG. 9, the method of reducing initial barstock size in a barstock body fluid control valve of the present invention comprises the steps of cutting barstock of the predetermined size, outer wall configuration and material to length; forming a valve body by machining flat surfaced ends on said barstock perpendicular to said barstock outer wall; aligning to longitudinally bore said barstock along a centerline eccentrically located to position bore closer to said barstock outer wall; machining a throughbore in said barstock along said eccentric centerline; machining a valve stem bore perpendicular to said throughbore, positioning said valve stem bore a maximum distance from eccentric centerline; installing a standard size valve stem; wherein the eccentrically located bore permits the standard size valve stem to be used with a resulting thinner barstock wall thickness on the valve body opposite the valve stem.

| Reference numerals | |
|---|---|
| 1 | assembly |
| 2 | valve body |
| 3 | flow control ball |
| 4 | valve stem |
| 5 | stem tab |
| 6 | stem seal |
| 7 | port |
| 8 | port |
| 9 | valve seats |
| 10 | handle |
| 11 | barstock centerline |
| 12 | throughbore centerline |
| 13 | assembly- 3 port valve |
| 14 | valve body |
| 15 | 3-way flow control ball |
| 16 | valve stem |
| 17 | stem tab |
| 18 | stem seal |
| 19 | port |
| 20 | port |
| 21 | valve seats |
| 22 | handle |
| 23 | barstock centerline |
| 24 | throughbore centerline |
| 25 | outlet port |
| 26 | passage |
| 29 | valve stem |
| 31 | barstock |
| 33 | through port |
| 39 | valve stem |
| 41 | long valve stem |
| 43 | barstock valve body |
| 45 | bottom port |
| 47 | body |
| 49 | through port |
| 51 | stem |
| 53 | body |
| X | through port centerline |
| Y | dashed barstock centerline |

I claim:

1. A barstock body fluid control valve comprising:
   a barstock body of preselected material having an inlet end and an outlet end, and a uniform transverse cross-sectional perimeter defining the outer walls, wherein the uniform transverse cross-sectional perimeter of the barstock body remains unaltered from an originally manufactured barstock body;
   a through machined main flow port located eccentrically on said inlet and said outlet ends;

wherein said main flow port eccentric location increases the available barstock thickness at one outer wall location and decreases barstock thickness in the opposite wall.

2. The valve according to claim 1 further comprising a machined stem port perpendicular to said flow port positioned at said increased barstock thickness.

3. The valve according to claim 1 further comprising a machined bottom flow port perpendicular to said flow port; a machined stem port centrally aligned with said bottom flow port, said stem port machined through the opposite outer wall of said barstock body; wherein barstock cross section is minimized adjacent to the stem port.

4. The valve according to claim 1 in the form of a quarter turn ball valve.

5. A two port fluid control valve comprising:
a barstock body having outer walls extending between an inlet end and an outlet end defined by a uniform transverse cross-sectional perimeter circumscribed about a central longitudinal axis, wherein the uniform transverse cross-sectional perimeter of the barstock body remains unaltered from an originally manufactured barstock body;
a machined through bore extending between the inlet end and the outlet end of the barstock body about an offset longitudinal throughbore axis parallel spaced from the central longitudinal axis,
the through bore is eccentrically located with respect to the outer walls producing a thicker outer wall portion and a relatively thinner opposite wall portion of the barstock body; and
wherein a stem port communicates perpendicularly with said throughbore machined through said thicker outer wall portion of the barstock body.

6. A three port fluid control valve comprising:
a barstock body having outer walls extending between an inlet end and an outlet end defined by a uniform transverse cross-sectional perimeter circumscribed about a central longitudinal axis, wherein the uniform transverse cross-sectional perimeter of the barstock body remains unaltered from an originally manufactured barstock body;
a machined through bore extending between the inlet end and the outlet end of the barstock body about an offset longitudinal through bore axis parallel spaced from the central longitudinal axis,
the through bore is eccentrically located with respect to the outer walls producing a thicker outer wall portion and a relatively thinner opposite wall portion of the barstock body;
a machined bottom flow port formed perpendicular to said through bore through the thicker outer wall portion; and
a machined stem port communicates perpendicularly with said throughbore and axially aligned with said bottom flow port, said stem port machined through the thinner opposite wall portion of said barstock body.

7. A method of forming a barstock body fluid control valve using reduced barstock size and a standard size valve stem, the method comprising the steps of:
selecting the reduced size barstock having a uniform transverse cross-sectional perimeter defining an outer wall configuration formed about a longitudinal center line and cutting the reduced barstock size to length;
maintaining the uniform transverse cross-sectional perimeter of the barstock body unaltered from an originally manufactured barstock body;
forming a valve body by machining flat surfaced ends on said reduced barstock size perpendicular to said barstock outer wall;
defining a throughbore axis offset from and parallel to the longitudinal centerline of the barstock;
machining a throughbore in said barstock symmetrically about the offset throughbore axis to produce an eccentrically located throughbore defining a thicker portion and a thinner portion of said barstock outer wall;
machining a valve stem bore perpendicular to said throughbore in the thicker portion of the barstock outer wall located a maximum distance from said offset throughbore axis;
selecting a standard size valve stem to be inserted in the valve stem bore in the thicker portion of the barstock outer wall resulting in the thinner portion of the barstock wall positioned opposite the valve stem; and
installing the standard size valve stem in said valve stem bore.

* * * * *